March 15, 1949. H. A. DELIUS 2,464,440
CENTRIFUGAL SEPARATOR
Filed July 31, 1945 3 Sheets-Sheet 2
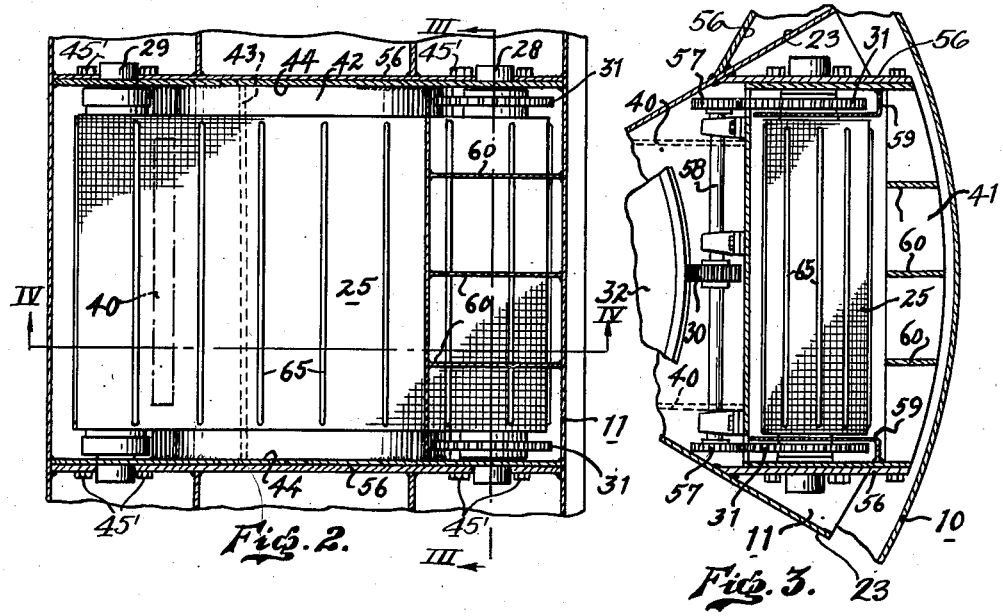
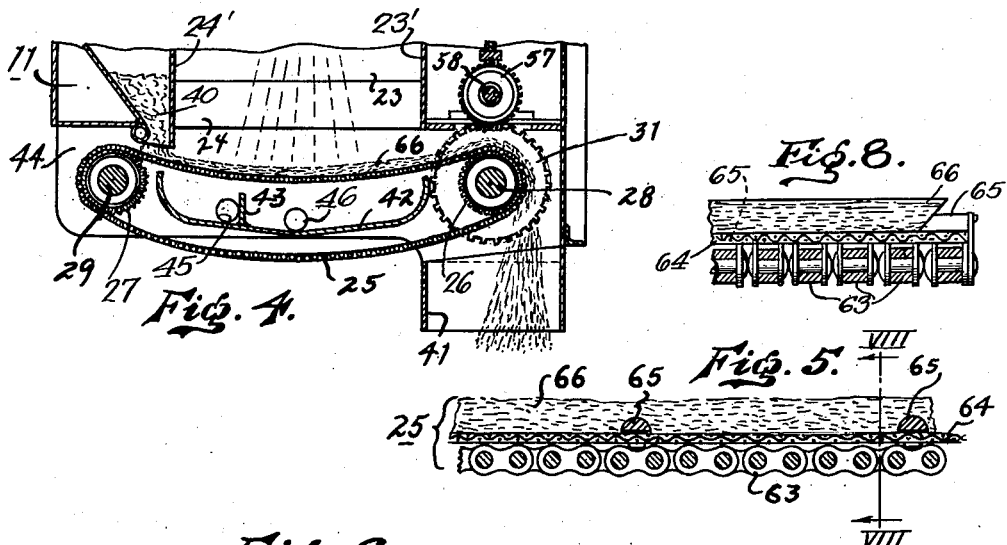
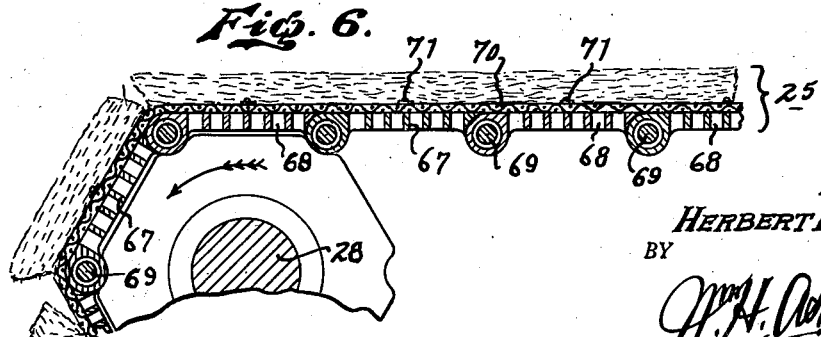
INVENTOR.
HERBERT A. DELIUS
BY
*W. H. Atkinson*
ATTORNEY

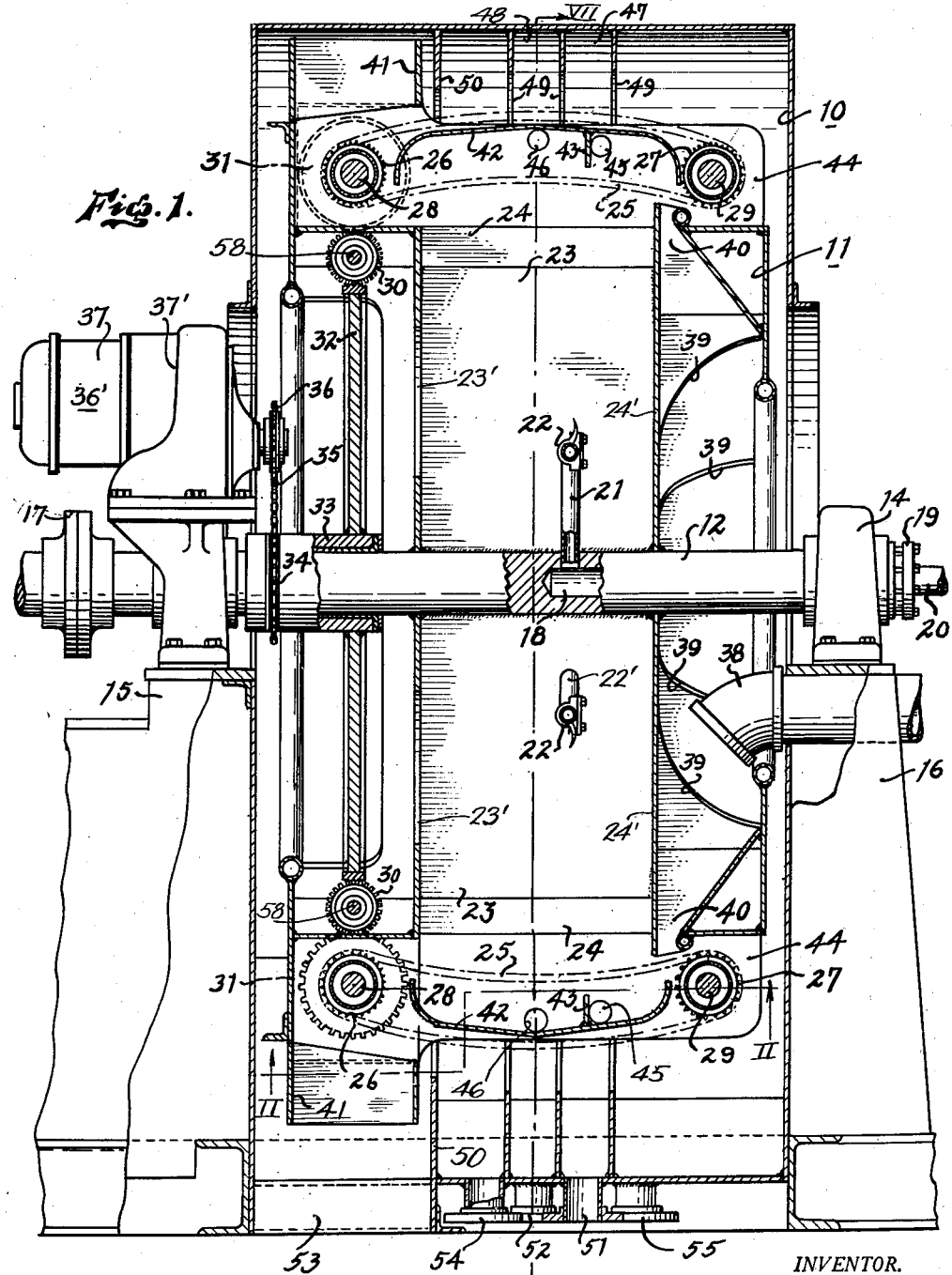

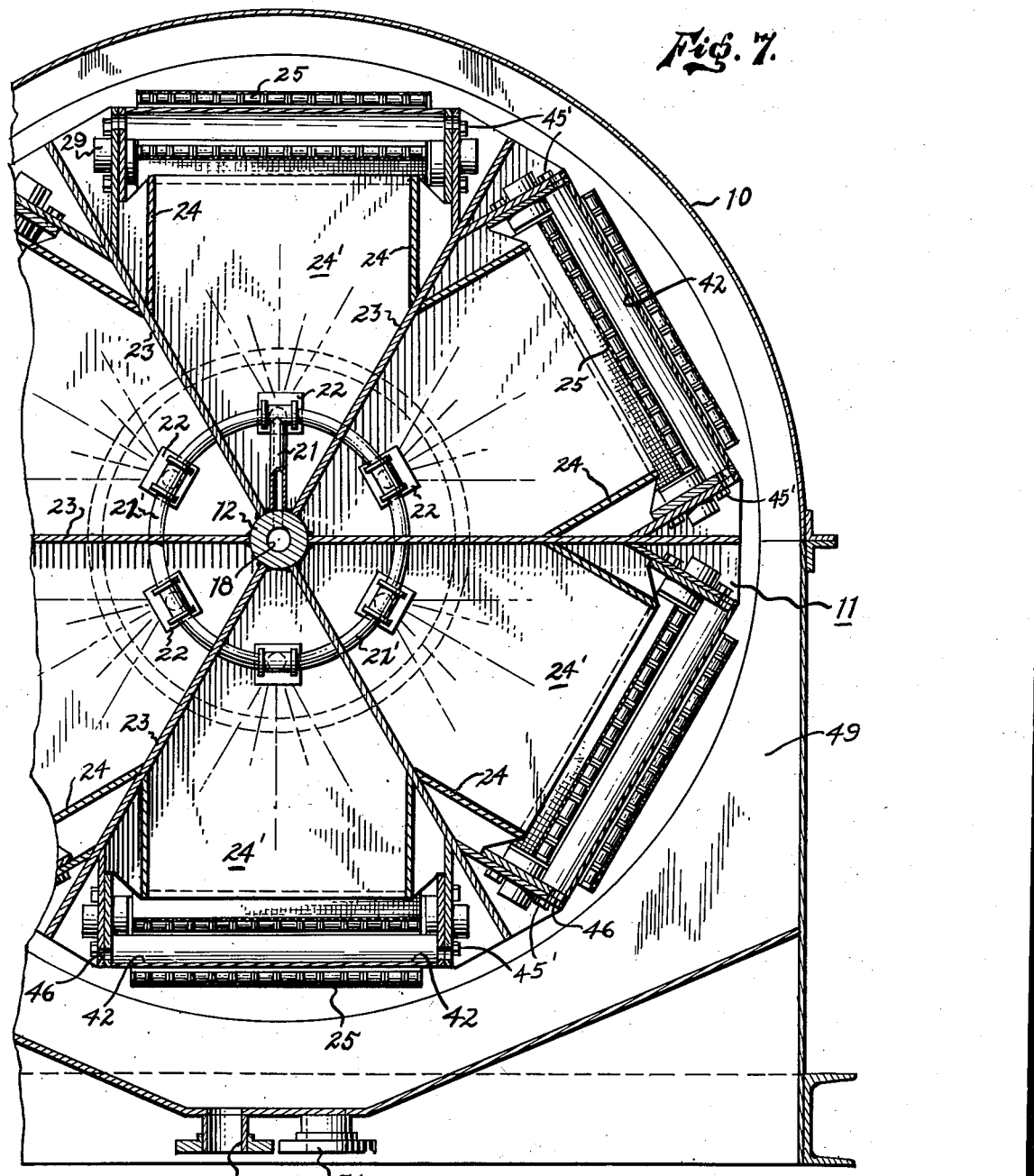

Patented Mar. 15, 1949 2,464,440

UNITED STATES PATENT OFFICE 2,464,440

CENTRIFUGAL SEPARATOR

Herbert A. Delius, Berkeley, Calif.

Application July 31, 1945, Serial No. 608,016

5 Claims. (Cl. 210—68)

My present invention relates to the art of filtering and washing crystalline substances, and more particularly to an improved means for filtering and/or washing crystals in which centrifugal force and mechanical movement of the material to be filtered or washed are combined to provide a continuously operating device.

The principal object of my invention is to provide a filtering and/or washing device for crystalline substances that may be operated in a continuous manner to separate solids from a liquid.

Another object of the invention is to provide a centrifugal type of filtering device that may be operated in a continuous manner and in which the filtering surface thereof will also be continuously cleared of clogging particles by centrifugal force as the device operates.

Another object of the invention is to provide a device having a novel arrangement of filter elements in which the material to be filtered and/or washed is moved through the device in an axial direction from a point of introduction to a point of discharge upon a moving filter surface while being simultaneously subjected to centrifugal force.

Another object of the invention is to provide an improved type of sugar washing centrifugal in which a massecuite may be fed to a moving substantially flat filter surface and subjected to centrifugal force while being sprayed with a washing liquid and finally discharged therefrom in a continuous manner.

Further objects of the invention are to provide a centrifugal type of filtering device that may be operated in a continuous manner to separate crystalline solids from a mother liquor, or for the clarification of liquids, either with or without the use of a filter aid, for dewatering or washing of solids and/or the separation of different solids by the use of a solvent of one or more of the solids.

In the past, where the centrifugal principle has been employed in a continuously operating device for the separation of sugar crystals from liquors and the like, mechanical means have been relied upon for pushing or moving the crystalline solids across a filtering surface as it is being subjected to centrifugal force. But, while the use of such a means has been found satisfactory with some materials, it is objectionable where other materials are being filtered. This is due to the fact that the mechanical solids pushing or moving means has a tendency to exert pressure upon the crystals to their damage. And in the case of sugar, this results in appreciable loss in the proportion of the solids recovered. An additional objection to the employment of mechanical solids moving or discharging means in a centrifugal type of filter or separator is that the filtering surfaces are also subjected to high mechanical stresses which are exerted by the mechanical discharging means and, therefore, the nature and types of screens and/or filter surfaces which are usable in such a device are limited.

As distinguished from these prior art devices, my invention avoids the need of any mechanical pushing or scraping means for moving the material through the device, as it contemplates the use of a continuously moving belt-like filter surface that will operate to carry the material in a relatively thin layer through a washing and filtering zone without requiring any relative movement between the material and the filtering surface and, therefore, practically any known type of filter surface forming medium may be used in my device. A further advantage obtained by the use of a belt-like filter constructed in accordance with this invention is that the filter surface will be of a continuously renewing character, as the unexposed portion thereof will be cleared of all clogging particles by centrifugal force, while the exposed portion is operating to filter the material placed thereupon.

In addition to the above objects, others will be in part evident to those skilled in the art, and in part pointed out hereinafter in the following description taken in connection with the accompanying drawings, wherein there is shown by way of illustration and not of limitation a preferred embodiment of the invention.

In the drawings:

Figure 1 is a vertical sectional view of a device constructed in accordance with the invention and adapted for operation upon a horizontal axis, Figure 2 is a fragmentary sectional view taken alone line II—II of Figure 1 looking in direction of arrows and turned end for end, Figure 3 is a fragmentary sectional view taken along line III—III of Figure 2 and showing the end of one of the filter units, Figure 4 is a fragmentary sectional view of the rotor element taken along line IV—IV of Figure 2, looking in direction of arrows, Figures 5 and 6 are detailed views showing two forms of filter surface providing means that may be used with my invention.

Figure 7 is a partial sectional view taken along line VII—VII of Figure 1, looking in direction of arrows, and Figure 8 is a sectional view taken along line VIII—VIII of Figure 5, looking in direction of arrows.

In order to facilitate the description of my present invention, there is shown in the drawings a device that has been designed primarily for the purpose of separating crystals from their mother liquor by the use of a wash water. However, it is to be understood that the apparatus, with certain modifications and/or modes of operation, may be rendered suitable for the carrying out of other filtering operations. For example, a slurry, composed of a filter aid, might be fed into the machine for separation, or a liquid, which it is desired to filter or clarify, might be sprayed into the machine by modifying the operation in a manner that will hereinafter appear.

As shown in Figures 1 and 7 of the drawings, the device chosen for illustration comprises a welded steel housing 10 within which there is mounted a rotor 11 that is mounted upon a main shaft 12. In this showing the main shaft 12 is disposed horizontal and is journaled in bearings 13 and 14 that are mounted upon suitable pedestals 15 and 16 located at the outer ends of the housing 10. However, it is to be understood that the rotor 11 may be mounted to rotate about a vertical axis if desired. The shaft 12 has a coupling 17 at one end for connection with any suitable source of motive power, and at its other end it is provided with an internal bore 18 and a stuffing box 19 to which an external liquid supply conduit 20 is connected. At the inner end of the internal bore 18 the main shaft 12 also carries a radially extending pipe 21 that forms a supply connection for a plurality of spray nozzles 22 which are carried by an annular supporting pipe 22' disposed within the rotor 11. In this arrangement the rotor 11 is divided up into six compartments, each of which is formed by partitions 23 that extend radially outward from the main shaft 12. At their outer ends these partitions 23 merge with diverging walls 24 that provide a plurality of equally spaced and substantially rectangular openings about the periphery of the rotor 11 for the spray emanating from the nozzles 22 when the device is in operation. Disposed outwardly and in register with each of the rectangular openings formed by the diverging walls 24 and two transversely disposed annular walls 23' and 24' of the rotor 11, there is a continuous belt-like filter surface forming member 25 that is adapted to travel axially and operate in a plane substantially tangent to the perimeter of the rotor 11. As will hereinafter appear, this belt-like filter surface forming member 25 may take many forms. In the present arrangement the filter surface forming member 25 is shown as including a wide link-belt that is mounted to move about driving sprockets 26 and tail sprockets 27 that are respectively journaled upon axially spaced and tangentially extending shafts 28 and 29 that are supported by the rotor 11. Associated with each of the driving sprockets 26 there is a driving worm gear 30 that operates, as will later appear, to drive gear wheels 31 which are connected to the sprockets 26. The driving worm gears 30 are in turn driven by a relatively large worm wheel 32 that has a hub 33 which is journaled to rotate about and relative to the shaft 12. The hub 33 of the worm wheel 32 is also provided with a sprocket 34 that is connected through a sprocket chain 35 to a second sprocket 36 which is mounted upon the output end of a suitable variable speed driving unit. In Figure 1 of the drawings, this variable speed driving unit, designated by the numeral 37, comprises an electric motor 36' which operates through a variable speed transmission 37' to stop, reverse or drive the sprocket 36 relative to the main shaft 12, in either direction and at a speed depending upon the speed of the motor 36' and the gear ratios of the transmission 37'. At the other end of the housing 10 there is a stationary supply pipe 38 through which the material to be filtered and/or separated may be introduced into the apparatus. For this purpose the rotor 11 is shown as having a plurality of radially extending partitions 39 which with the annular wall 24' will provide a corresponding plurality of hoppers having outlet or feed directing funnels 40 by which the material introduced through the supply pipe 38 may be discharged upon the filter surface forming members 25. At the other end of the filter surface forming member 25 the rotor 11 is provided with outwardly extending chutes or discharge outlets 41 through which the solids not passing through the filter surface forming members 25 may be discharged into the housing 10 and collected independently of the filtrate and/or other liquid separated therefrom by the filter surface forming members 25. In this latter connection the rotor 11 also carries pans 42, one of which is associated with each of the filter surface forming members 25. These pans 42 are disposed between the shafts 28 and 29 and extend throughout substantially the entire operating area of the filter surface forming members 25. Intermediate their ends, the pans 42 have a partition 43 by which different concentrations of filtrate and/or wash water may be separated when thrown through the filter surface forming member 25 by centrifugal force. These pans 42 are welded at their sides to parallel extending walls 44 between which the belt-like filter surface forming members 25 are disposed, and in conjunction therewith they provide a receptacle into which the filtrate and/or wash water will be collected by centrifugal force as the apparatus operates. Extending through one or both of the above walls 44 there are also suitable openings 45 and 46 through which the filtrate and/or wash water thus collected will be discharged respectively into annular channels 47 and 48 that are formed between three axially spaced annular partitions 49 which extend around the inner wall of the housing 10. An additional annular partition 50 serves to insure against a mixing of the filtrate and/or wash water with the solids discharged through the chutes or discharge outlets 41 of the rotor 11. At its bottom the housing 10 is modified so as to provide collecting basins from which discharge pipes 51 and 52 extend for conveying the filtrate and/or wash water away from the apparatus. Likewise, the housing 10 is provided with a larger discharge outlet 53 through which the solids accumulated by the filter surface forming member 25 may be discharged. At this point it will be noted that the housing 10 is also provided with two additional pipe connections 54 and 55 by which any accumulation of material may be removed from the housing at points adjacent the annular channels formed by the partitions 49. At the same time, these pipe connections will afford a means through which the interior of the housing may be periodically washed.

Upon referring to Figures 2 and 3 of the drawings, it will be noted that the parallel walls 44, between which the filter surface forming members 25 operate, are spaced so as to fit between correspondingly disposed walls 56 that are formed as a part of the rotor element 11. In this way, the entire unit, which comprises the spaced parallel walls 44, the shafts 28 and 29, the pan 42 and the filter surface forming members 25, is secured in position by bolts 45' so that it may be removed as a unit for repair, adjustment and/or renewal. As here shown, the shafts 28, located at the driving ends of the filter surface forming members 25, carry two of the gear wheels 31, one at each side of the filter surface forming member 25, and disposed inwardly from these gear wheels 31 there are cooperating driving gears 57 that are carried by an axially extending shaft 58, at the center of which the driving worm gear 30 is mounted. In Figure 3 of the drawings it will also be noted that the gear wheels 31 are each enclosed by a cover 59 that extends inwardly thereover to prevent the accumulation of stray liquids or solids thereupon. This cover 59 is not always required and has been omitted from Figures 2 and 4 of the drawings to show the driving gears 31. In addition, the discharge outlets 41 are also shown as having laterally extending partitions 60 that will serve to engage and cause the solids discharged therethrough to be carried around and dropped at the enlarged bottom part of the housing 10. As is more clearly shown in Figure 2 of the drawings, the pan 42 is of such width that it will underlie the outlet area of the feed directing funnels 40, as is indicated by dot and dash lines, and as a result, all liquid passing through the filter surface forming members 25 will be effectively collected in the pans 42.

By referring now to Figure 4 it will be noted that the partitions 43, previously referred to as disposed in the bottoms of the filtrate collecting pans 42, are so disposed that the more concentrated original liquid or syrup will be collected at one side thereof for discharge through the port 45 which is disposed in register with the annular channel 47 to which the discharge pipe 51 is connected, while the more dilute liquid and/or wash water will be collected at the other side thereof and flow out through a port 46 that is in register with the annular channel 48 to which the discharge pipe 52 is connected. In this figure of the drawings the spray water, shown by dotted lines as discharged by the nozzles 22 upon the material carried along by the filter surface forming members 25, is of a distributed character. However, it will be understood that the spray nozzles 22 may be of a design that will provide any form of spray. For example, the nozzles 22 may be of the type that provides a sheet-like spray which will engage the material being filtered along a substantially straight, narrow line at either one or the other side of the partition 43 which divides the filtrate and wash water collecting pan 42. At this point it should also be stated that the driving and tail sprockets 26 and 27 may take many forms. This will be determined by the nature of the filter surface forming members 25. For example, if these latter members are composed of a plurality of parallel extending, closely spaced link chains, the shafts 28 and 29 will carry a plurality of correspondingly spaced independent sprockets over which the individual lengths of chain will operate. On the other hand, if the filter surface forming members 25 are of the conventional link-belt construction, the shafts 28 and 29 may support an elongated gear or fluted cylinder over which the link-belt will operate. It is also conceivable that in some instances the chain and sprocket feature may be eliminated by providing cylindrical belt supporting pulleys, over which a fabric or other form of belt-like filter surface forming member 25 may operate.

In Figures 5 and 8 of the drawings there is shown in detail the construction of a filter surface forming member of the character referred to above, in which a plurality of closely spaced and parallel roller-type link-chains 63 are used as a backing for a filter surface forming fabric 64 that is secured thereupon by means of transversely extending cleats 65 which are arranged at suitably spaced points throughout the length of the belt-like member so formed. In this figure the filter surface forming fabric 64 is shown as carrying a layer of the material, designated by the numeral 66, which is undergoing filtration. With a filter surface forming member of this character, it will be understood that the shafts 28 and 29 will have a plurality of closely spaced sprockets that will move in unison as the gear wheels 31 are driven by the driving gears 57 which are in turn caused to rotate by the driving worm gear 30 that meshes with the worm wheel 32 upon the main shaft 12.

In Figure 6 there is illustrated another type of filter surface forming member, such as has been designated above by the numeral 25. In this arrangement the shafts 28 and 29 are shown as carrying fluted hexagonal rollers over which articulately connected plate-like members 67 are adapted to operate. These plate-like members 67 are provided with suitably spaced perforations 68, and at their ends they are connected together by means of transversely extending pintles 69. Disposed over these plates 67 there is also a filter surface forming fabric 70 that is secured thereto by means of transversely extending cleats 71. In connection with these filter surface forming fabrics 64 and 70, it should be stated that they may be of metal or fiber and need not necessarily be of woven construction. For example, a perforated metal sheet, having the required flexibility, may be substituted therefor. And in addition to these fabrics or perforated sheets, the filter surface forming members 25 may also be of a type which will support a granular filter aid or surface, such as a diatomaceous earth or the like.

The operation of my device should be apparent from the above. But, it is believed that a typical example of an operation of the device here illustrated may be helpful in that connection. The particular device here described is designed primarily for the washing and filtering of sugar massecuite, and by way of construction, it has the following characteristics. The rotor 11 is so dimensioned that the filter surface forming members 25 will present their inside filter surface in a circle having a radius of two feet and, as a result, when the rotor is driven at a speed of 580 revolutions per minute, a centrifugal force will be developed at the filter surface equaling approximately 225 times that of gravity. With a rotor operating at this speed, the pitch of the worm wheel 32 will be so proportioned that the worm gear 30 and the gears 57 will drive the belt-like filter surface forming member 25 at a speed of 15 feet per minute when this worm wheel 32 is held stationary with respect to the housing 10. In other words, under these conditions of operation, the driving worm gears 30 will turn the shaft 58 and the driving gears 57 as the driving worm gears 30 move about in engagement with the stationary worm wheel 32. Now, if the shaft 37, which carries the sprocket 36, is driven through a reversible and variable speed driving unit having a 6-1 speed range, it will be possible to effect a travel of the belt-like filter surface forming members 25 at a speed ranging from zero to 30 feet per minute in an infinite number of steps. It will, therefore, be seen that by properly controlling the relative rotation of the worm wheel 32 and the speed of the rotor 11, any required condition of operation may be obtained. At the same time, it will be understood that the quantity and nature of the spray emanating from the nozzles 22 may be likewise changed to suit the particular speed of travel of the material as it is held by centrifugal force and carried along upon the filter surface forming members 25. Now, with the apparatus constructed as above described, it will be seen that when a sugar massecuite is introduced through the supply pipe 38, this massecuite will enter between the fins 39 at the adjacent end of the rotor 11 and be thrown out by centrifugal force through the funnels 40 and upon the leading end of the belt-like filter surface forming members 25. The material will then be carried along axially of the rotor 11 in an evenly distributed layer through a middle zone of the rotor where it will be subjected to a spray of wash water projected thereupon by the nozzles 22. At this point it will be noted that the funnels 40, which extend outwardly from the hoppers formed by the fins 39, are projected outwardly so that their spacing with respect to the filter surface forming members 25 will operate to determine the depth of the layer of material that will be deposited upon the belt-like filter surface forming members 25. After the material has been discharged upon the belt-like filter surface forming members 25, and while being subjected to the spray of wash water, the original syrup will be collected at one side of the partition 43 in the pan 42 during the early stages of operation and then, during a portion of the remainder of its travel, it will be further washed and this wash water will be collected in the filtrate pan 42 and separated from the original syrup at the other side of the partition 43. Following this and during the further travel of the material, the solids will be subjected to a drying operation so that when they are finally discharged over the end of the belt-like filter surface forming members 25 and into the discharge outlets 41, they will be substantially free of entrained water. Then, as the rotor 11 continues in its operation, the solids will be carried around by the partition 60 in the discharge outlet 41 and be dropped at the bottom of the housing 10 for collection at the discharge outlet 53, while the filtrate and wash water will be collected at the discharge pipes 51 and 52.

While I have, for the sake of clearness and in order to disclose the invention so that the same can be readily understood, described and illustrated specific devices and arrangements, I desire to have it understood that the invention is not limited to the specific forms disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patents is:

1. In a centrifugally operating filter of the character described, the combination of a main rotatable shaft, a rotor-like member secured upon said main shaft having a plurality of radially disposed compartments formed therein and opening outwardly at the periphery thereof, separate movable belt-like filter forming means carried by said rotor-like member and disposed over the open ends of each of said compartments and operating in planes substantially tangent to the periphery of said rotor-like member and traveling in a direction parallel with the axis thereof, means within each of said compartments for directing a spray of washwater over said belt-like filter forming means as it travels over the opening at the peripheries thereof, means for discharging a material to be washed and filtered upon one end of said belt-like filter forming means, means associated with said filter forming means for collecting the washwater passing therethrough, a discharge outlet at the trailing end of said belt-like filter forming means for collecting the washed and filtered substance carried through said spray by said belt-like filter forming means, a separate driving means for each of said belt-like filter forming means including a shaft adjacent each of said compartments extending tangent to said main rotatable shaft, a worm gear carried by each of said tangentially extending shafts, a single worm wheel journaled for free relative rotation upon said main rotatable shaft and meshing with each of the worm gears upon said tangentially extending shafts, and means for producing a relative forward or reverse rotation of said worm wheel with respect to said main rotatable shaft as it operates to turn said rotor-like member, whereby the speed of travel of said belt-like filter forming means may be varied as they are carried around the axis of said main rotatable shaft by said rotor-like member.

2. In a centrifugally operating filter of the character described, the combination of a rotatable shaft, a rotor-like member carried by said shaft having a plurality of compartments formed therein with openings at the periphery thereof, a plurality of movable belt-like filter means carried by said rotor-like member and disposed one over each of the openings of said compartments adapted to travel in a direction substantially parallel with the axis of said rotatable shaft, means for discharging a material to be filtered upon one end of each of said belt-like filter means, means associated with each of said filter means for collecting the filtrate passing therethrough, a discharge outlet at the trailing end of each of said belt-like filter means for collecting the solids discharged at the ends thereof, a single worm wheel journaled for free relative rotation upon said rotatable shaft, a drive for each of said belt-like filter means including a worm gear having a driving connection therewith and meshing with said single worm wheel, and means for imparting a relative forward or reverse rotation of said worm wheel with respect to said rotatable shaft as said rotor-like member rotates, whereby the speed of travel of said belt-like filter means may be varied as they are carried around the axis of said rotatable shaft by said rotor-like member.

3. In a centrifugally operating device of the character described, the combination of a main rotatable shaft, a rotor-like member secured upon said main shaft having a plurality of compartments opening outwardly at the periphery thereof, a plurality of continuously movable belt-like filter elements carried by said rotor-like member and disposed one over each of the openings of said compartments adapted to operate in a plane tangent to the periphery of said rotor-like member and travel in a direction substantially parallel with the axis thereof, means for directing a material to be filtered to one end of said belt-like filter means, means intermediate the ends of said filter means for collecting the filtrate passing therethrough, a discharge outlet carried by said rotor-like member at the other end of said belt-like filter means for collecting the solids discharged from the surface thereof, a shaft journaled upon said rotor-like member inwardly from each of said belt-like filter means and extending tangent to said rotatable shaft, a gear drive between said latter shafts and each of said belt-like filter means, a worm gear keyed upon each of said latter shafts, a single worm wheel mounted for relative rotation upon said rotatable shaft and meshing with each of said worm gears, and means for imparting a relative rotation to said worm wheel with respect to said rotatable shaft as said rotor-like member turns therewith, whereby the speed of travel of said belt-like filter means may be varied from zero to any value desired independently of the speed of rotation of said rotatable shaft.

4. In a centrifugal filtering device of the character described, the combination of an enclosing housing, a rotor element mounted to operate within said housing having a plurality of open-ended compartments that radiate outwardly from the center thereof, a pair of spaced parallel shafts disposed outwardly and extending transverse to the axis of said rotor member, a continuous link-belt member disposed over said spaced parallel shafts for linear movement over the outer open ends of each of said compartments, a filter surface forming means carried by said link-belt, means for introducing material to be filtered upon the filter surface forming means as they move over the open ends of the compartment of said rotor element, a rotatable shaft upon which said rotor element is carried, a counter shaft disposed outwardly from said rotatable shaft and extending transversely thereto, a gear connection between said counter shaft and one of the spaced parallel shafts between which said continuous link-belt member is suspended, a worm gear keyed upon said counter shaft, a worm wheel journaled for free relative rotation upon said main rotatable shaft, and means for imparting relative rotation of said worm wheel with respect to said main rotatable shaft, whereby the speed of linear travel of said link-belt member may be regulated while said rotor element is in rotation.

5. In a centrifugally operating filter device of the character described, the combination of a rotatable shaft, a rotor-like member carried by said rotatable shaft having a material accommodating hopper which discharges outwardly at the periphery thereof, a movable belt-like filter member mounted upon said rotor-like member and disposed for travel under the discharge outlet of said hopper, a driving shaft connected to said belt-like filter member for driving it in a direction parallel to the axis of said rotatable shaft, a worm gear keyed upon said driving shaft, a worm wheel journaled for relative rotation upon said rotatable shaft and meshing with said worm gear, stationary means for feeding a material into said hopper for discharge upon one end of said belt-like filter member while said rotor-like member is in rotation, means at the other end of said belt-like filter member for collecting the solids discharged therefrom, and means for driving said worm wheel independently of said rotatable shaft to produce relative forward or reverse rotation thereof with respect to said rotor-like member while in rotation, whereby the speed of travel of said belt-like filter member may be varied as it is carried around the axis of said rotatable shaft by said rotor-like member.

HERBERT A. DELIUS.

REFERENCES CITED

The following references are of record in the file of this patent:

UNITED STATES PATENTS

| Number | Name | Date |
| --- | --- | --- |
| 96,304 | Brinjes | Nov. 2, 1869 |
| 1,280,469 | Hiller | Oct. 1, 1918 |
| 1,309,651 | Mulet | July 15, 1919 |
| 1,988,794 | Hill | Jan. 22, 1935 |
| 2,037,840 | Weston | Apr. 21, 1936 |
| 2,139,401 | Bleil | Dec. 6, 1938 |